US012659491B2

(12) United States Patent
Jhu et al.

(10) Patent No.: US 12,659,491 B2
(45) Date of Patent: Jun. 16, 2026

(54) METHODS AND DEVICES FOR HIGH PRECISION INTRA PREDICTION

(71) Applicant: BEIJING DAJIA INTERNET INFORMATION TECHNOLOGY CO., LTD., Beijing (CN)

(72) Inventors: Hong-Jheng Jhu, San Diego, CA (US); Xiaoyu Xiu, San Diego, CA (US); Wei Chen, San Diego, CA (US); Che-Wei Kuo, San Diego, CA (US); Ning Yan, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/927,806

(22) Filed: Oct. 25, 2024

(65) Prior Publication Data

US 2025/0056012 A1 Feb. 13, 2025

Related U.S. Application Data

(63) Continuation of application No. PCT/US2023/020287, filed on Apr. 27, 2023.
(Continued)

(51) Int. Cl.
*H04N 19/00* (2014.01)
*H04N 19/159* (2014.01)
*H04N 19/17* (2014.01)

(52) U.S. Cl.
CPC .......... *H04N 19/159* (2014.11); *H04N 19/17* (2014.11)

(58) Field of Classification Search
CPC ....................................................... H04N 19/00
See application file for complete search history.

(56) References Cited

U.S. PATENT DOCUMENTS

2013/0034158 A1 2/2013 Kirchhoffer et al.
2017/0353719 A1 12/2017 Liu et al.
(Continued)

FOREIGN PATENT DOCUMENTS

WO 2021244935 A1 12/2021
WO 2022218316 A1 10/2022
(Continued)

OTHER PUBLICATIONS

International Search Report issued in PCT Application No. PCT/US2023/020287 dated Aug. 23, 2023, (2p).
(Continued)

*Primary Examiner* — Maryam A Nasri
(74) *Attorney, Agent, or Firm* — Arch & Lake LLP; Hao Tan; Shen Wang

(57) ABSTRACT

A method for video decoding includes: obtaining a first control flag signaled at a specified level that includes one of following levels: a Transform Block (TB) level, a Coding Block (CB) level, a slice level, a picture level, or a sequence level, wherein the first control flag indicates whether a Decoder-side High Precision Intra Mode Derivation (DHI) mode is enabled, and in response to determining that the DHI mode is enabled, deriving, using a predefined method, high precision intra mode under a predefined condition, where the predefined condition includes one of following conditions: specific modes, or specific block sizes, or the DHI mode is used at the specified level.

20 Claims, 16 Drawing Sheets

Related U.S. Application Data

(60) Provisional application No. 63/335,723, filed on Apr. 27, 2022.

(56) References Cited

U.S. PATENT DOCUMENTS

| | | |
|---|---|---|
| 2017/0374369 A1 | 12/2017 | Chuang et al. |
| 2020/0320746 A1 | 10/2020 | Sato |
| 2021/0006714 A1 | 1/2021 | Kim |
| 2024/0031564 A1* | 1/2024 | Ahn ........................ H04N 19/70 |

FOREIGN PATENT DOCUMENTS

| | | |
|---|---|---|
| WO | 2023055840 A1 | 4/2023 |
| WO | 2023192336 A1 | 10/2023 |

OTHER PUBLICATIONS

Extended European Search Report of EP Application No. 23797317.7 dated Apr. 8, 2026, (18p).
Xie, Zhihuang, et al., "AHG 12: On signalling of intra template matching," Joint Video Experts Team (JVET) of ITU-T SG 16 WP 3 and ISO/IEC JTC 1/SC 29, JVET-X0124-v2, 24th Meeting, teleconference, Oct. 6-15, 2021, (5p).

* cited by examiner

Current Frame

Reconstructed pixels

Unavailable pixels

Window

Current Block

⊗  801

∅  802

⬤  803

⊞  804

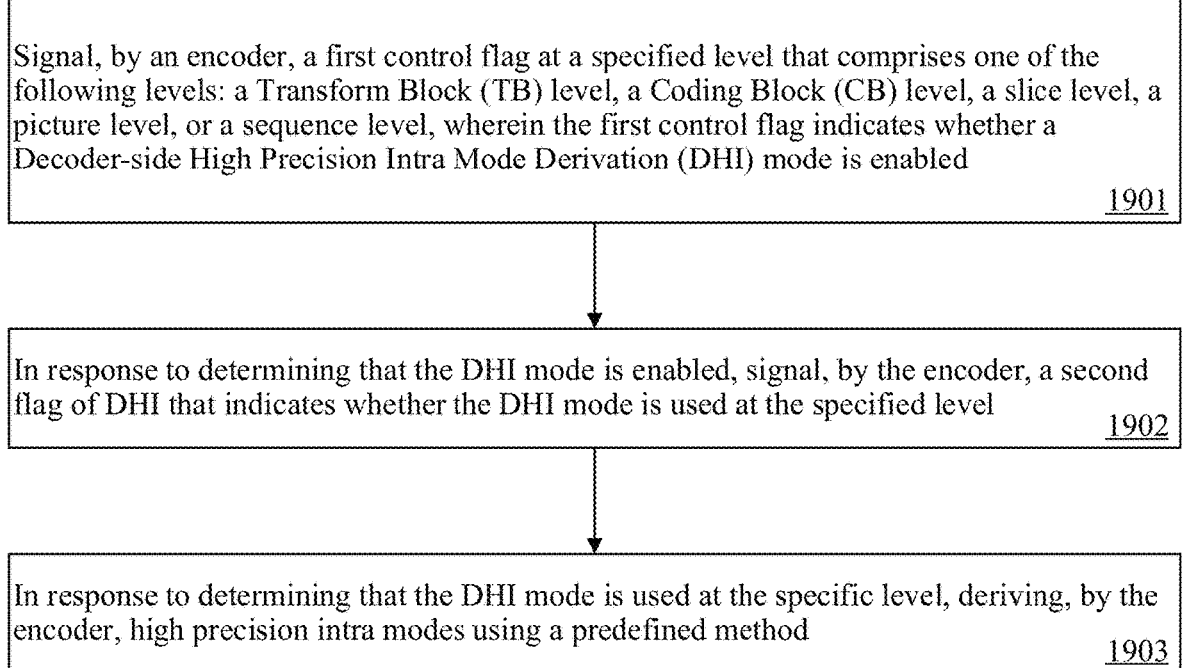

Signal, by an encoder, a first control flag at a specified level that comprises one of the following levels: a Transform Block (TB) level, a Coding Block (CB) level, a slice level, a picture level, or a sequence level, wherein the first control flag indicates whether a Decoder-side High Precision Intra Mode Derivation (DHI) mode is enabled

1901

In response to determining that the DHI mode is enabled, signal, by the encoder, a second flag of DHI that indicates whether the DHI mode is used at the specified level

1902

In response to determining that the DHI mode is used at the specific level, deriving, by the encoder, high precision intra modes using a predefined method

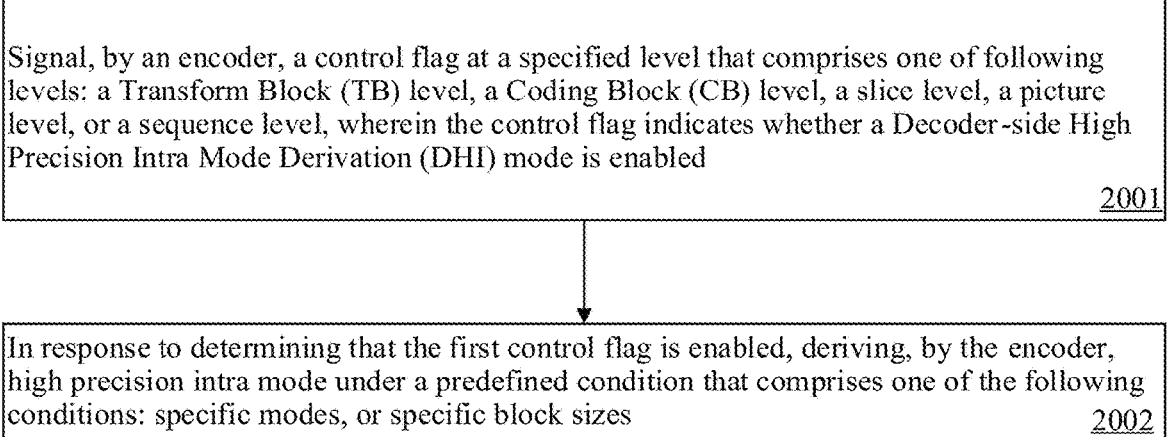

Signal, by an encoder, a control flag at a specified level that comprises one of following levels: a Transform Block (TB) level, a Coding Block (CB) level, a slice level, a picture level, or a sequence level, wherein the control flag indicates whether a Decoder-side High Precision Intra Mode Derivation (DHI) mode is enabled

2001

In response to determining that the first control flag is enabled, deriving, by the encoder, high precision intra mode under a predefined condition that comprises one of the following conditions: specific modes, or specific block sizes

METHODS AND DEVICES FOR HIGH PRECISION INTRA PREDICTION

CROSS-REFERENCE TO RELATED APPLICATIONS

This application is a Continuation application of International Application No. PCT/US2023/020287, filed on Apr. 27, 2023, which is based upon and claims priority to Provisional Applications No. 63/335,723, filed on Apr. 27, 2022. The entire content of forgoing applications is incorporated herein by reference for all purposes.

FIELD

This disclosure is related to video coding and compression. More specifically, this disclosure relates to methods and apparatus on improving the coding efficiency of the video blocks which applies high precision intra prediction technology.

BACKGROUND

Various video coding techniques may be used to compress video data. Video coding is performed according to one or more video coding standards. For example, video coding standards include versatile video coding (VVC), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods and apparatus for video coding and compression with high precision intra prediction technology.

According to a first aspect of the present disclosure, a method for video decoding is provided. The method may include: obtaining, by a decoder, a first control flag signaled at a specified level that comprises one of following levels: a Transform Block (TB) level, a Coding Block (CB) level, a slice level, a picture level, or a sequence level, where the first control flag indicates whether a Decoder-side High Precision Intra Mode Derivation (DHI) mode is enabled, in response to determining that the DHI mode is enabled, obtaining, by the decoder, a second flag of DHI that indicates whether the DHI mode is used at the specified level, and in response to determining that the DHI mode is used at the specific level, deriving, by the decoder, high precision intra modes using a predefined method.

According to a second aspect of the present disclosure, a method for video decoding is provided. The method may include: obtaining, by a decoder, a control flag signaled at a specified level that comprises one of following levels: a Transform Block (TB) level, a Coding Block (CB) level, a slice level, a picture level, or a sequence level, wherein the control flag indicates whether a Decoder-side High Precision Intra Mode Derivation (DHI) mode is enabled, and in response to determining that the control flag is enabled, deriving, by the decoder using a predefined method, high precision intra mode under a predefined condition that comprises one of the following conditions: specific modes, or specific block sizes.

According to a third aspect of the present disclosure, a method for video encoding is provided. The method may include: signaling, by an encoder, a first control flag at a specified level that comprises one of the following levels: a Transform Block (TB) level, a Coding Block (CB) level, a slice level, a picture level, or a sequence level, where the first control flag indicates whether a Decoder-side High Precision Intra Mode Derivation (DHI) mode is enabled, in response to determining that the DHI mode is enabled, signaling, by the encoder, a second flag of DHI that indicates whether the DHI mode is used at the specified level, and in response to determining that the DHI mode is used at the specific level, deriving, by the encoder, high precision intra modes using a predefined method.

According to a fourth aspect of the present disclosure, a method for video encoding is provided. The method may include: signaling, by an encoder, a control flag at a specified level that comprises one of following levels: a Transform Block (TB) level, a Coding Block (CB) level, a slice level, a picture level, or a sequence level, wherein the control flag indicates whether a Decoder-side High Precision Intra Mode Derivation (DHI) mode is enabled, and in response to determining that the control flag is enabled, deriving, by the encoder using a predefined method, high precision intra mode under a predefined condition that comprises one of the following conditions: specific modes, or specific block sizes.

According to a fifth aspect of the present disclosure, there is provided an apparatus for video decoding. The apparatus includes one or more processors and a memory coupled to the one or more processors and configured to store instructions executable by the one or more processors. Furthermore, the one or more processors, upon execution of the instructions, are configured to perform the method according to the first and second aspects above.

According to a sixth aspect of the present disclosure, there is provided an apparatus for video encoding. The apparatus includes one or more processors and a memory coupled to the one or more processors and configured to store instructions executable by the one or more processors. Furthermore, the one or more processors, upon execution of the instructions, are configured to perform the method according to the third and fourth aspects above.

According to a seventh aspect of the present disclosure, there is provided a non-transitory computer-readable storage medium storing computer-executable instructions that, when executed by one or more computer processors, cause the one or more computer processors to receive a bitstream, and perform the method according to the first and second aspects above.

According to an eighth aspect of the present disclosure, there is provided a non-transitory computer-readable storage medium storing computer-executable instructions that, when executed by one or more computer processors, cause the one or more computer processors to perform the method according to the third and fourth aspects to encode the current block into a bitstream, and transmit the bitstream.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 19 is a flow chart illustrating a method for video encoding corresponding to the method for video decoding as shown in FIG. 17 in accordance with some examples of the present disclosure.

FIG. 20 is a flow chart illustrating a method for video encoding corresponding to the method for video decoding as shown in FIG. 18 in accordance with some examples of the present disclosure.

DETAILED DESCRIPTION

Figure 1:
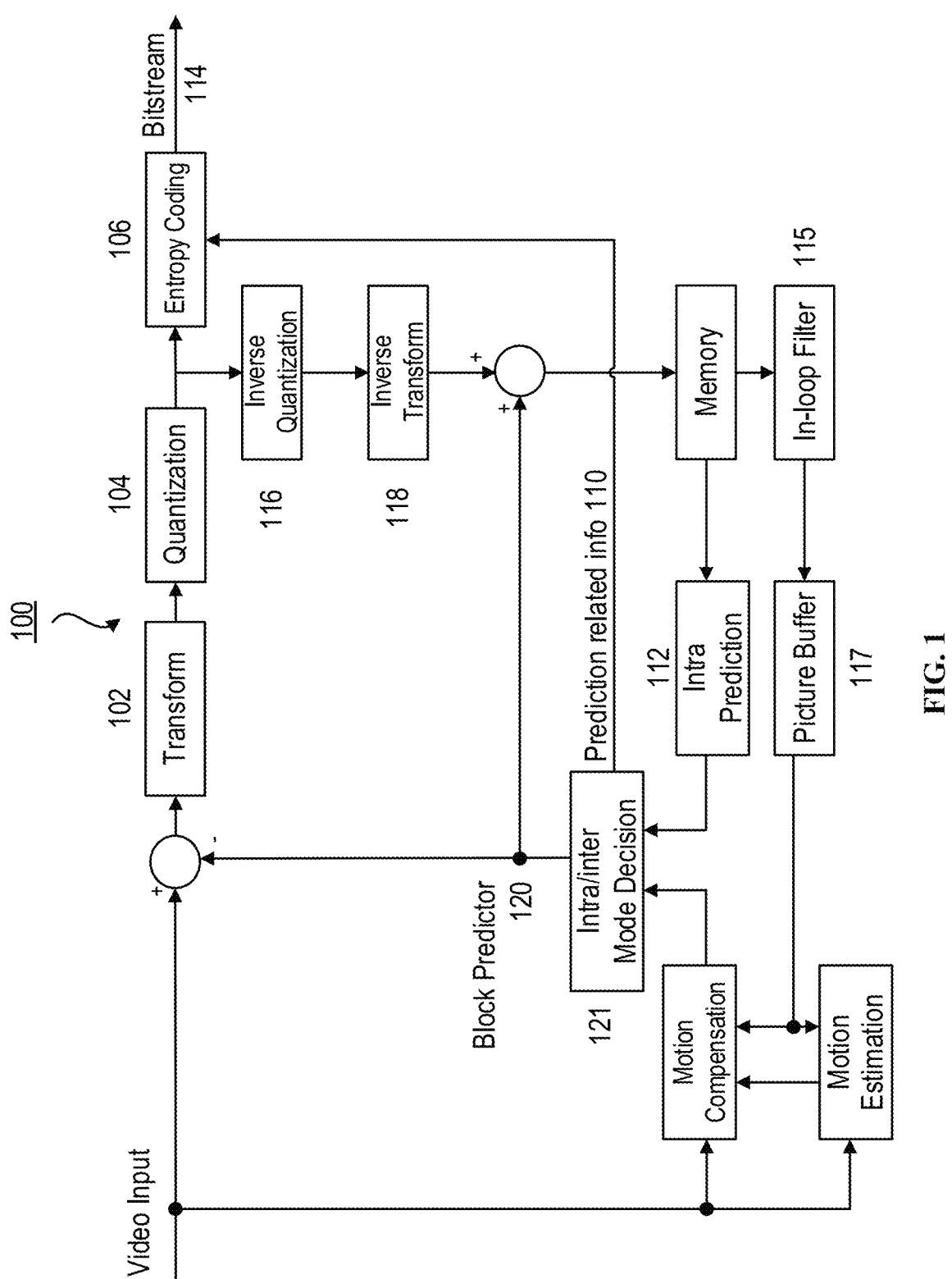
FIG. 1 is a block diagram of a video encoder system in accordance with some examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But various alternatives may be used in the embodiments of the present disclosure. For example, the subject matter presented herein may be implemented on many types of electronic devices with digital video capabilities.

Terms used in the disclosure are only adopted for the purpose of describing specific embodiments and not intended to limit the disclosure. "A/an," "said," and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The first version of the VVC standard was finalized in July 2020, which offers approximately 50% bit-rate saving or equivalent perceptual quality compared to the prior generation video coding standard HEVC. Although the VVC standard provides significant coding improvements than its predecessor, there is evidence that superior coding efficiency can be achieved with additional coding tools. Recently, Joint Video Exploration Team (JVET) under the collaboration of ITU-T VECG and ISO/IEC MPEG started the exploration of advanced technologies that can enable substantial enhancement of coding efficiency over VVC. In April 2021, one software codebase, called Enhanced Compression Model (ECM) was established for future video coding exploration work. The ECM reference software was based on VVC Test Model (VTM) that was developed by JVET for the VVC, with several existing modules (e.g., intra/inter prediction, transform, in-loop filter and so forth) are further extended and/or improved. In future, any new coding tool beyond the VVC standard need to be integrated into the ECM platform, and tested using JVET common test conditions (CTCs).

Figures 2A, 2B, 2C, 2D, 2E:
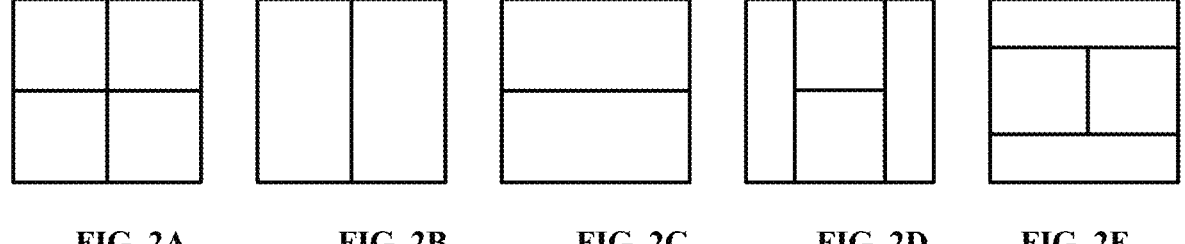
FIGS. 2A-2E are schematic diagrams illustrating different block partitions in a multi-type tree structure in accordance with some examples of the present disclosure.

Similar to all the preceding video coding standards, the ECM is built upon the block-based hybrid video coding framework. FIG. 1 gives the block diagram of a generic block-based hybrid video encoding system. The input video signal is processed block by block (called coding units (CUs)). In ECM-1.0, a CU can be up to 128×128 pixels. However, same to the VVC, one coding tree unit (CTU) is split into CUs to adapt to varying local characteristics based on quad/binary/ternary-tree. In the multi-type tree structure, one CTU is firstly partitioned by a quad-tree structure. Then, each quad-tree leaf node can be further partitioned by a binary and ternary tree structure. As shown in FIG. 2, there are five splitting types, quaternary partitioning, horizontal binary partitioning, vertical binary partitioning, horizontal ternary partitioning, and vertical ternary partitioning. In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes. After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

Figure 3:
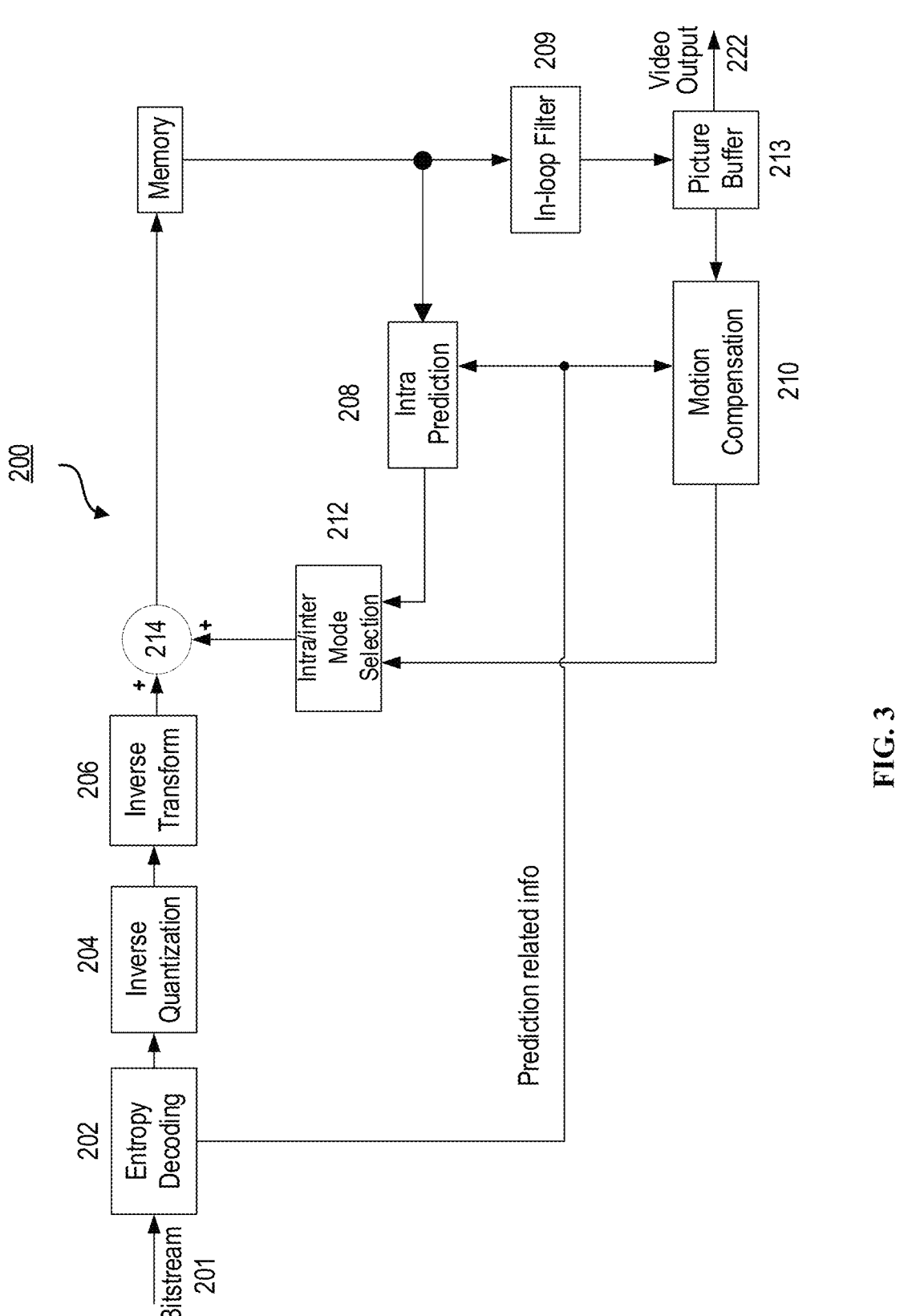
FIG. 3 is a block diagram of a video decoder in accordance with some examples of the present disclosure.

FIG. 3 gives a general block diagram of a block-based video decoder. The video bit-stream 201 is first entropy decoded at entropy decoding unit 202. The coding mode and prediction information are sent to either the spatial prediction unit (if intra coded) or the temporal prediction unit (if inter coded) to form the prediction block. For example, in FIG. 3, a block predictor mechanism, implemented in an Intra/inter Mode Selector 212, is configured to perform either an Intra Prediction 208, or a Motion Compensation 210, based on decoded prediction information. The residual transform coefficients are sent to inverse quantization unit 204 and inverse transform unit 206 to reconstruct the residual block. The prediction block and the residual block are then added together (by, e.g., using a summer 214). The reconstructed block may further go through in-loop filtering (e.g., in-loop filter 209) before it is stored in reference picture store (e.g., picture buffer 213). The reconstructed video in reference picture store is then sent out (e.g., video output 222) to drive a display device, as well as used to predict future video blocks.

The main focus of this disclosure is to further enhance the coding efficiency of the coding tool of high precision intra prediction. In the following, some related coding tools in the ECM are briefly reviewed. After that, some deficiencies in the existing design of DIMD/TIMD are discussed. Finally, the solutions are provided to improve the existing intra prediction design.

Decoder-Side Intra Mode Derivation (DIMD)

DIMD is an intra coding tool wherein the luma intra prediction mode (IPM) is not transmitted via the bitstream. Instead, it is derived using previously encoded/decoded pixels, in an identical fashion at the encoder and at the decoder. The DIMD method performs a texture gradient processing to derive 2 best modes. These two modes and planar mode are then applied to the block and their predictors are weighted averaged. The selection of DIMD is signaled in the bitstream for intra coded blocks using a flag. At the decoder, if the DIMD flag is true, the intra prediction mode is derived in the reconstruction process using the same previously encoded neighboring pixels. If not, the intra prediction mode is parsed from the bitstream as in classical intra coding mode.

Figure 4:
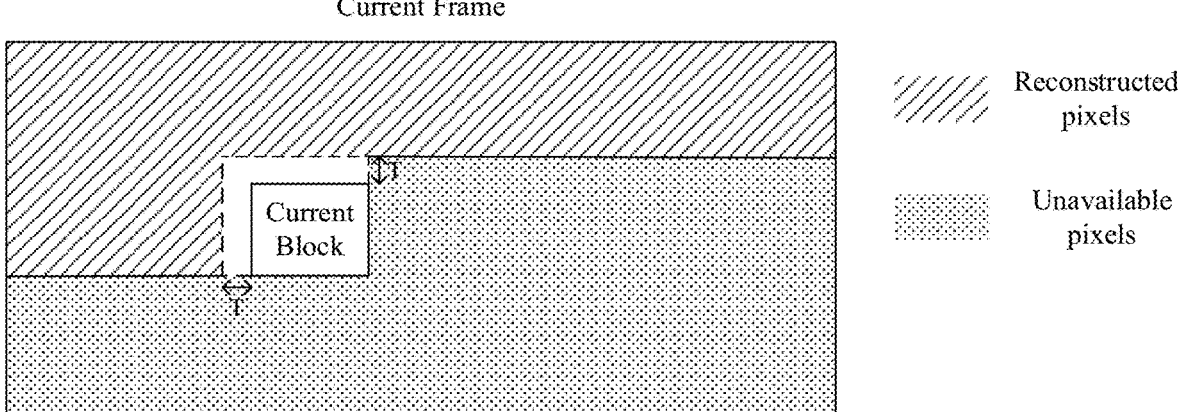
FIG. 4 illustrates a set of chosen pixels on which a gradient analysis is performed.

To derive the intra prediction mode for a block, a set of neighboring pixels on which we will perform a gradient analysis is first selected. For normativity purposes, these pixels should be in the decoded/reconstructed pool of pixels. As shown in FIG. 4, a template surrounding the current block by T pixels to the left, and T pixels above is chosen. Next, a gradient analysis is performed on the pixels of the template. This allows to determine a main angular direction for the template, which is assumed (and which may be the premise of the method in the disclosure) to have a high chance to be identical to the one of the current block. Thus, a simple 3×3 Sobel gradient filter is used, defined by the following matrices that will be convoluted with the template:

$$M_x = \begin{bmatrix} -1 & 0 & 1 \\ -2 & 0 & 2 \\ -1 & 0 & 1 \end{bmatrix}$$

and $$M_y = \begin{bmatrix} -1 & -2 & -1 \\ 0 & 0 & 0 \\ 1 & 2 & 1 \end{bmatrix}$$

For each pixel of the template, each of these two matrices is multiplied point-by-point with the 3×3 window centered around the current pixel and composed of its 8 direct neighbors, and sum the result. Thus, two values Gx (from the multiplication with Mx), and Gy (from the multiplication with My) corresponding to the gradient at the current pixel are obtained, in the horizontal and vertical direction respectively.

Figure 5:
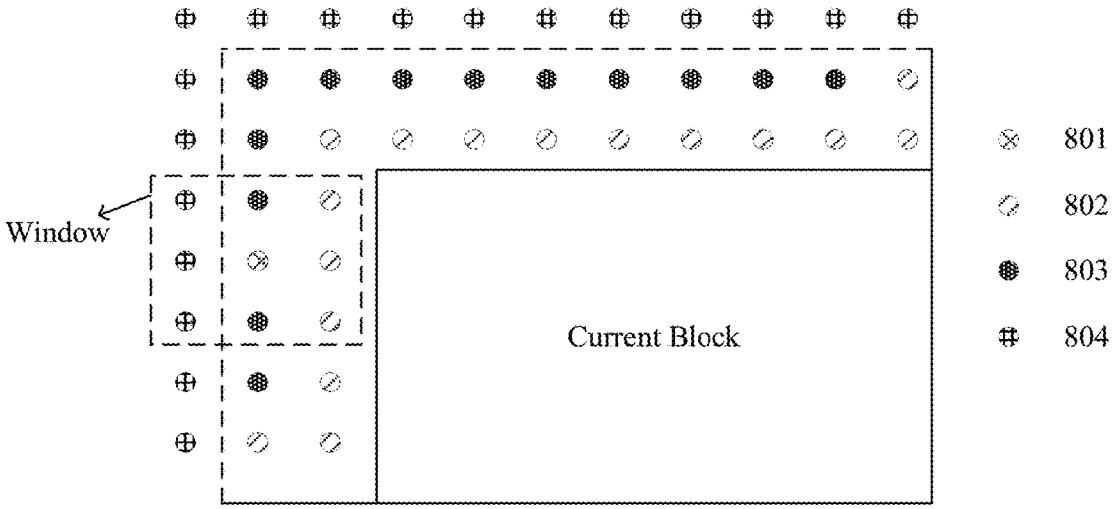
FIG. 5 illustrates a set of chosen pixels on which a gradient analysis is performed.

FIG. 5 shows the convolution process. The pixel 801 is the current pixel. Pixels 803 (including the 801) are pixels on which the gradient analysis is possible. Pixels 802 are pixels on which the gradient analysis is not possible due to lack of some neighbors. Pixels 804 are available (reconstructed) pixels outside of the considered template, used in the gradient analysis of the pixels 803. In case a pixel 804 is not available (due to blocks being too close to the border of the picture for instance), the gradient analysis of all pixels 803 that use this pixel 804 is not performed. For each pixel 803, intensity (G) and the orientation (O) of the gradient using Gx and Gy are computed as such:

$$G = |G_x| + |G_y|$$

and $$O = a\tan\left(\frac{G_y}{G_x}\right)$$

The orientation of the gradient is then converted into an intra angular prediction mode, used to index a histogram (first initialized to zero). The histogram value at that intra angular mode is increased by G. Once all the red pixels in the template have been processed, the histogram will contain cumulative values of gradient intensities, for each intra angular mode. The IPMs corresponding to two tallest histogram bars are selected for the current block. If the maximum value in the histogram is 0 (meaning no gradient analysis was able to be made, or the area composing the template is flat), then the DC mode is selected as intra prediction mode for the current block.

Figure 6:
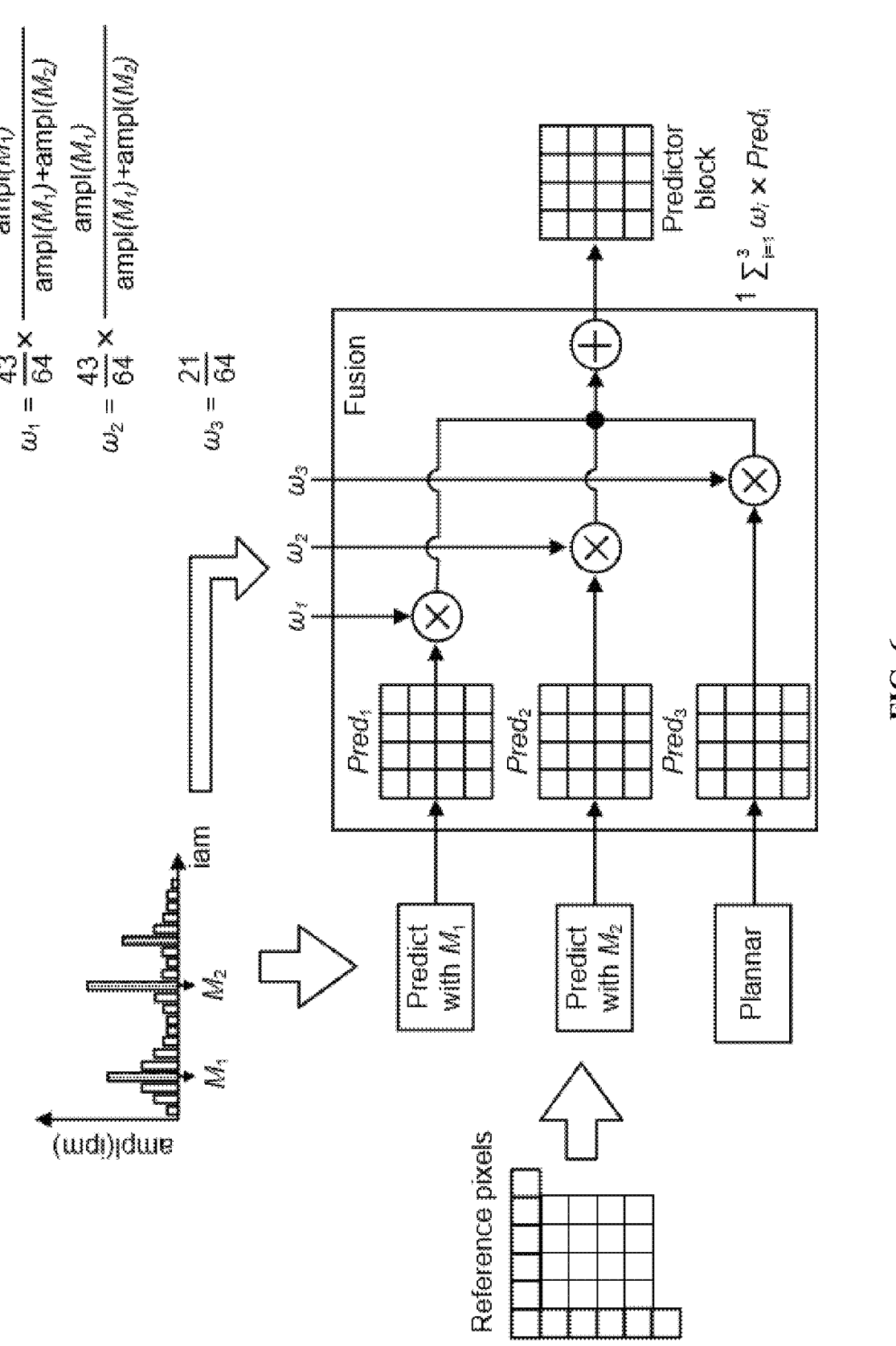
FIG. 6 illustrates prediction fusion by weighted averaging of two HoG mode and one planar mode in accordance with some implementations of the present disclosure.

The two IPMs corresponding to two tallest histogram of oriented gradient (HoG) bars are combined with the Planar mode. The prediction fusion is applied as a weighted average of the above three predictors. To this aim, the weight of planar is fixed to 21/64 (~⅓). The remaining weight of 43/64 (~⅔) is then shared between the two HoG IPMs, proportionally to the amplitude of their HoG bars. FIG. 6 visualizes this process.

Derived intra modes are included into the primary list of intra most probable modes (MPM), so the DIMD process is performed before the MPM list is constructed. The primary derived intra mode of a DIMD block is stored with a block and is used for MPM list construction of the neighboring blocks.

Template-Based Intra Mode Derivation (TIMD)

Figure 7:
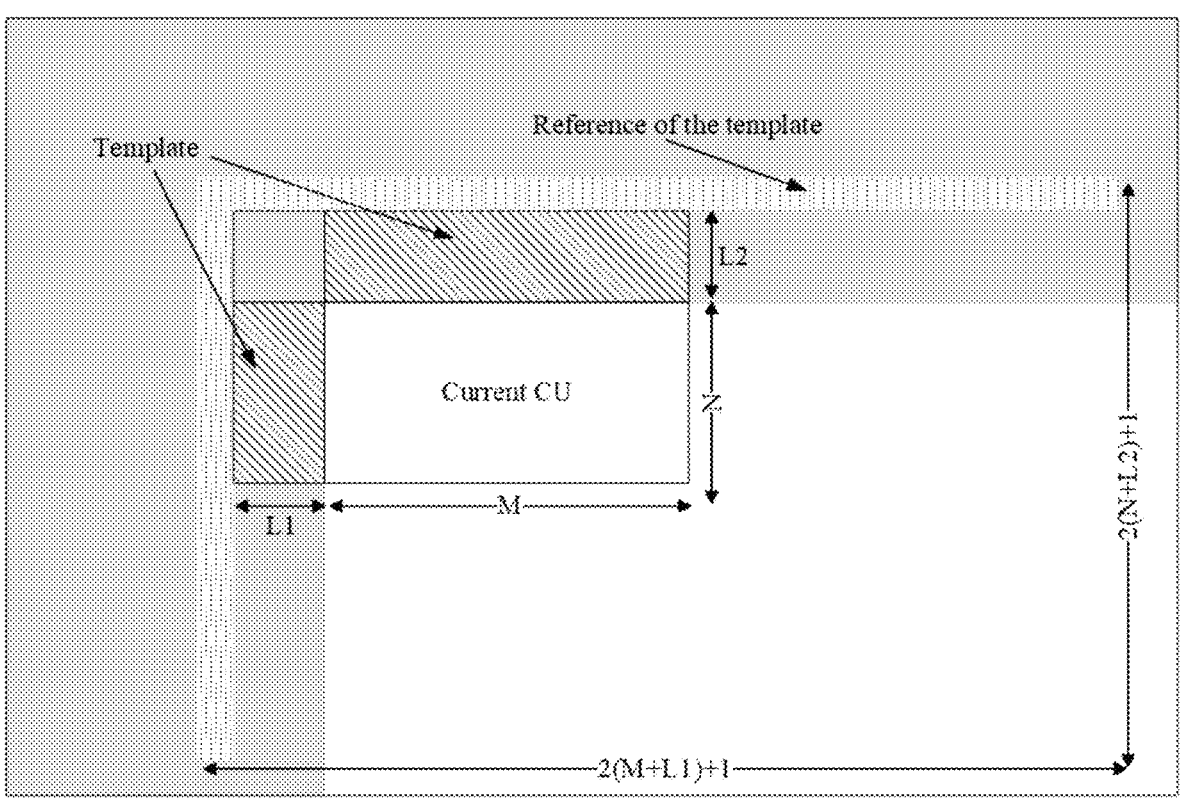
FIG. 7 illustrates template and its reference samples used in TIMD in accordance with some implementations of the present disclosure.

For each intra mode in MPMs, the sum of absolute transformed differences (SATD) between prediction and reconstruction samples of the template region shown in FIG. 7 is computed and the intra modes with the first two modes with the smallest SATD cost are chosen and then fused with the weights, and such weighted intra prediction is used to code the current CU.

The costs of the two selected modes are compared with a threshold, in the test the cost factor of 2 is applied as follows:

$$\text{costMode2} < 2 * \text{costMode1}.$$

If this condition is true, the fusion is applied, otherwise the only model is used.

Weights of the modes are computed from their SATD costs as follows:

$$\text{weight1} = \text{costMode2}/(\text{costMode1} + \text{costMode2})$$

$$\text{weight2} = 1 - \text{weight1}.$$

Intra Mode Coding with 67 Intra Prediction Modes

To capture the arbitrary edge directions presented in natural video, the number of directional intra modes in VVC is extended from 33, as used in HEVC, to 65. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

Intra Mode Coding

To keep the complexity of the most probable mode (MPM) list generation low, an intra mode coding method with 6 MPMs is used by considering two available neighboring intra modes. The following three aspects are considered to construct the MPM list:

Default intra modes

Neighbouring intra modes

Derived intra modes

A unified 6-MPM list is used for intra blocks irrespective of whether MRL and ISP coding tools are applied or not. The MPM list is constructed based on intra modes of the left and above neighboring block. Suppose the mode of the left is denoted as Left and the mode of the above block is denoted as Above, the unified MPM list is constructed as follows:

When a neighboring block is not available, its intra mode is set to Planar by default.

If both modes Left and Above are non-angular modes:

MPM list→{Planar, DC, V, H, V−4, V+4}

If one of modes Left and Above is angular mode, and the other is non-angular:

Set a mode Max as the larger mode in Left and Above

MPM list→{Planar, Max, Max−1, Max+1, Max−2, Max+2}

If Left and Above are both angular and they are different:

Set a mode Max as the larger mode in Left and Above

Set a mode Min as the smaller mode in Left and Above

If Max−Min is equal to 1:

MPM list→{Planar, Left, Above, Min−1, Max+1, Min−2}

Otherwise, if Max−Min is greater than or equal to 62:

MPM list→{Planar, Left, Above, Min+1, Max−1, Min+2}

Otherwise, if Max-Min is equal to 2:

MPM list→{Planar, Left, Above, Min+1, Min−1, Max+1}

Otherwise:

MPM list→{Planar, Left, Above, Min−1, −Min+1, Max−1}

If Left and Above are both angular and they are the same:

MPM list→{Planar, Left, Left−1, Left+1, Left−2, Left+2}

Besides, the first bin of the mpm index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Figure 8:
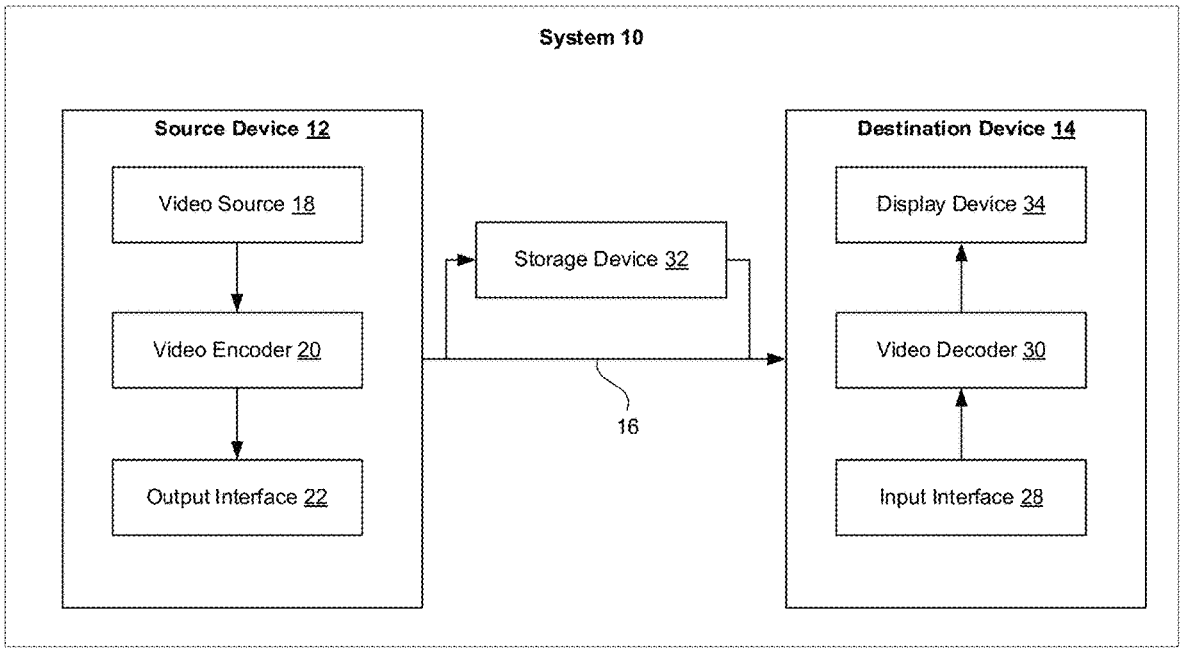
FIG. 8 is a block diagram illustrating an exemplary system for encoding and decoding video blocks in accordance with some implementations of the present disclosure.

FIG. 8 is a block diagram illustrating an exemplary system 10 for encoding and decoding video blocks in parallel in accordance with some implementations of the present disclosure. As shown in FIG. 8, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 8, the source device 12 includes a video source 18, a video encoder 20 and the output interface 22.

The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure.

Each of the video encoder 20 and the video decoder 30 may be included in one or more encoders or decoders, either of which may be integrated as part of a combined encoder/decoder (CODEC) in a respective device.

Figure 9:
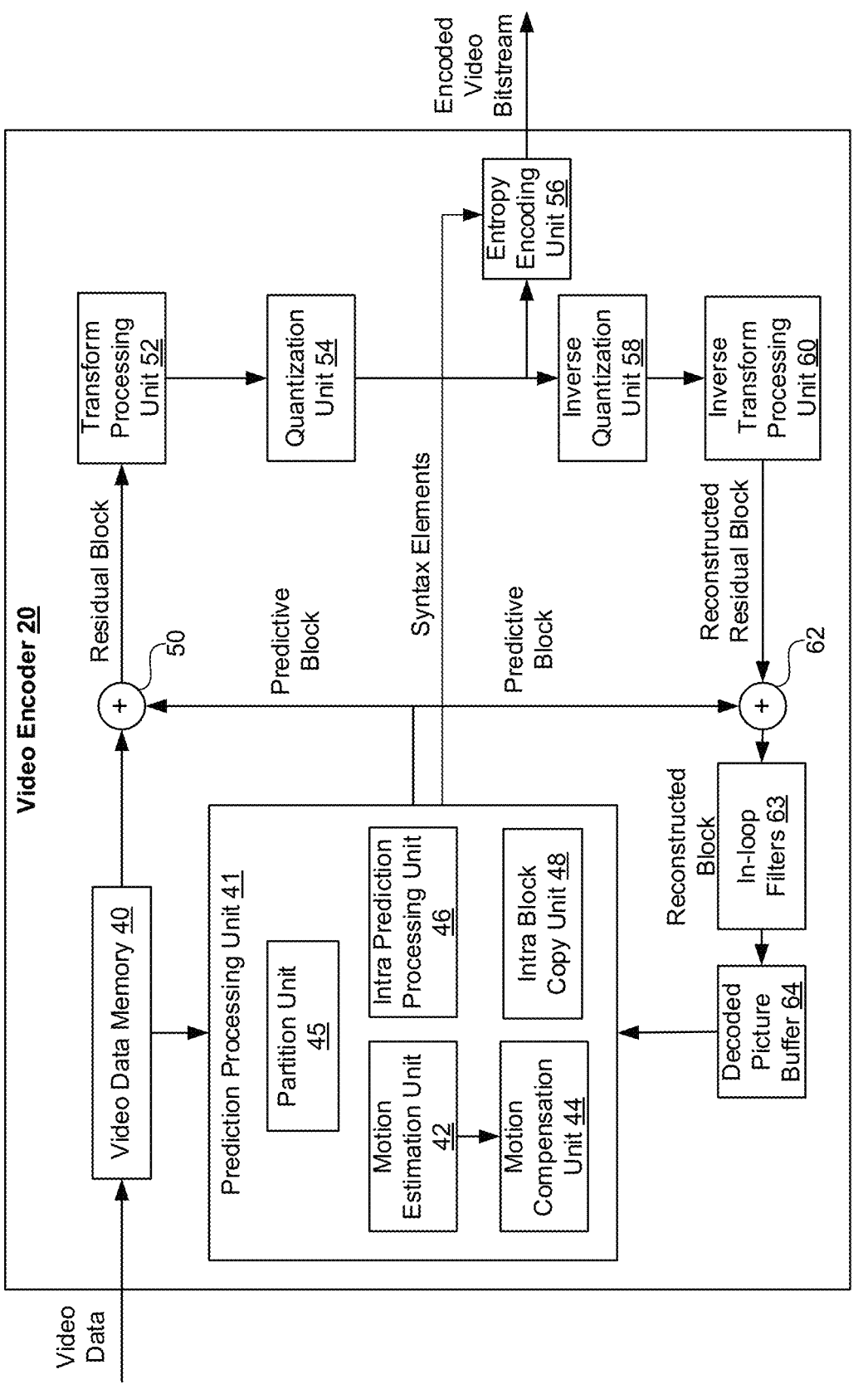
FIG. 9 is a block diagram illustrating an exemplary video encoder in accordance with some implementations of the present disclosure.

FIG. 9 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 9, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 8. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 9, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g. a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 8, or archived in the storage device 32 as shown in FIG. 8 for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 10:
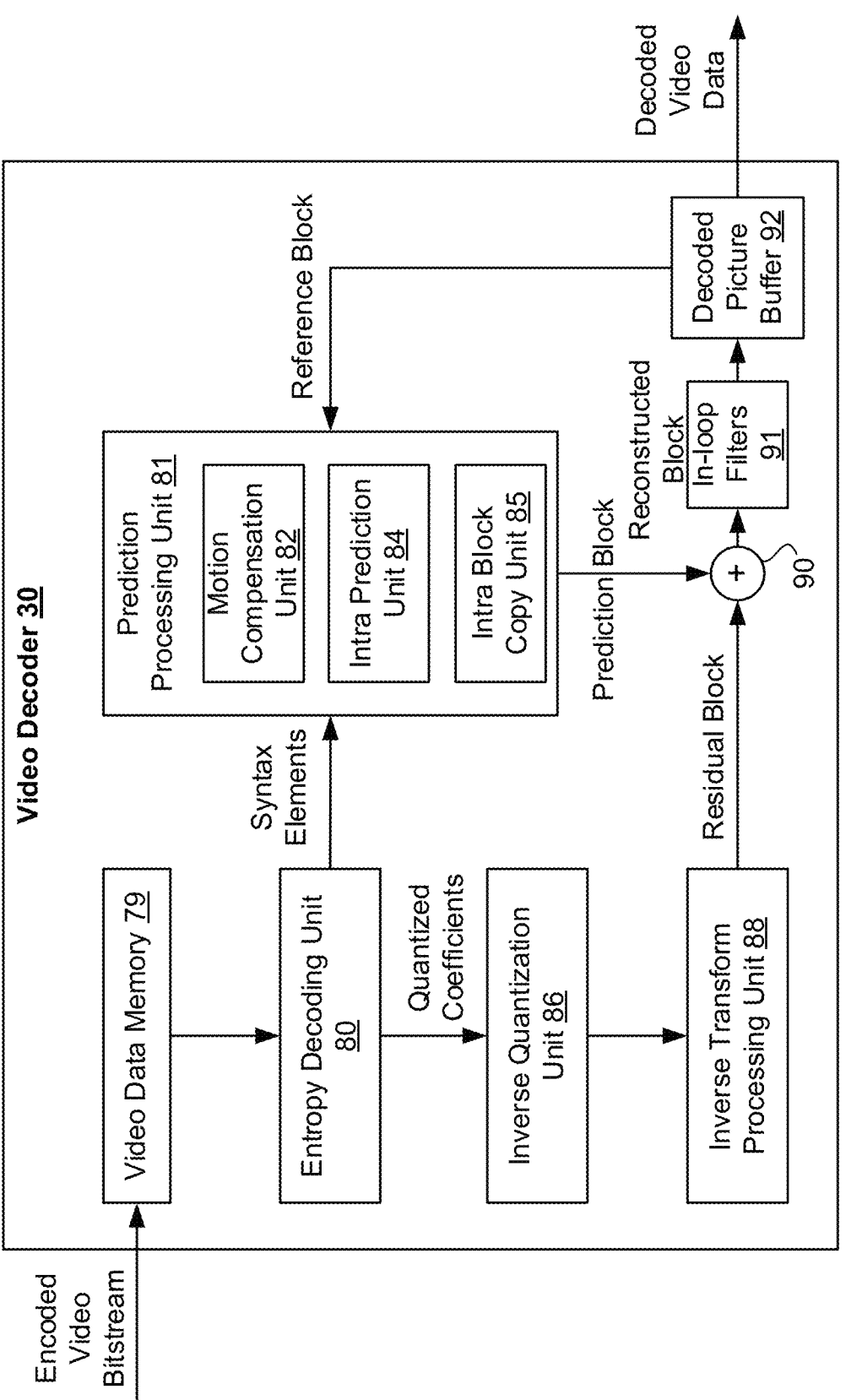
FIG. 10 is a block diagram illustrating an exemplary video decoder in accordance with some implementations of the present disclosure.

FIG. 10 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 9. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 10. But in some embodiments, the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 8.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 11:
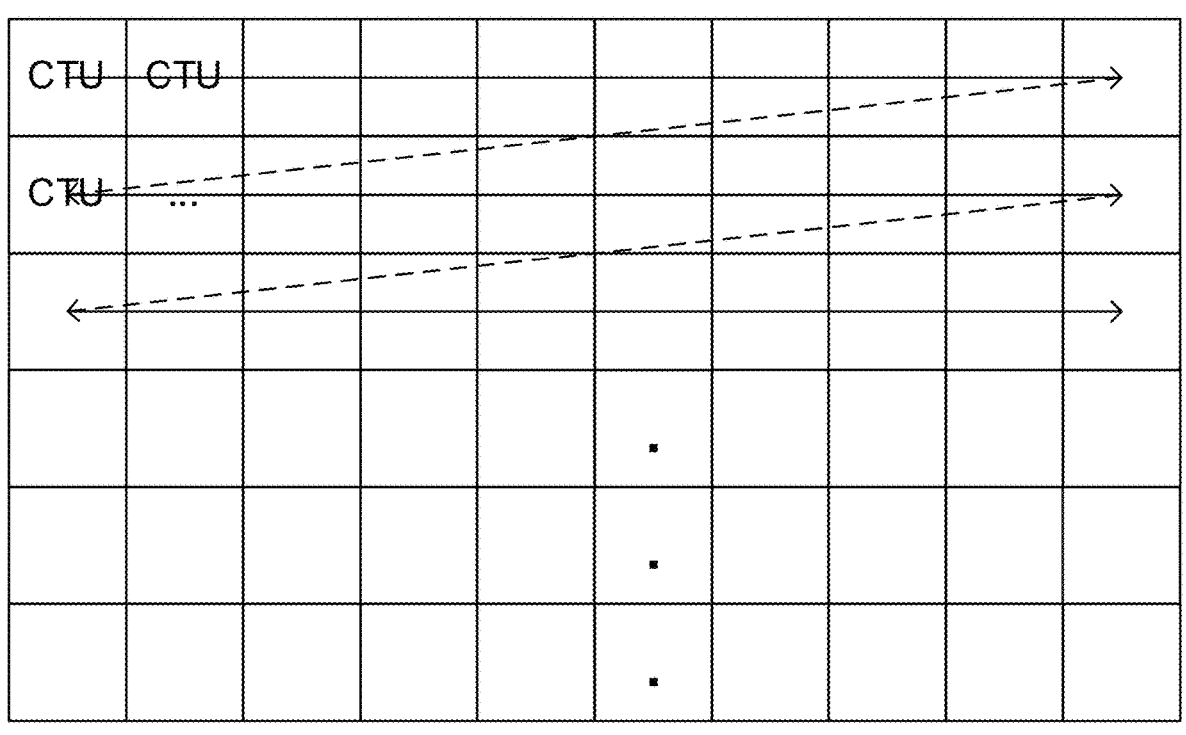
FIGS. 11, 12, 13 and 14 are block diagrams illustrating how a frame is recursively partitioned into multiple video blocks of different sizes and shapes in accordance with some examples of the present disclosure.
Figure 12:
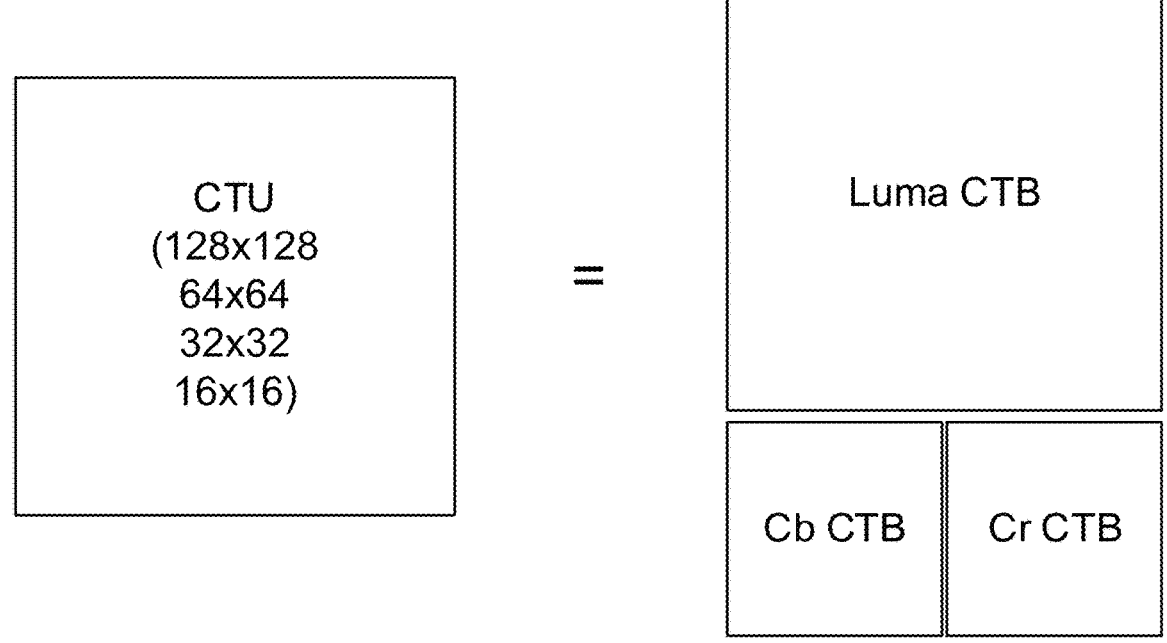

As shown in FIG. 11, the video encoder 20 (or more specifically the partition unit 45) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 12, each CTU may comprise one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 13:
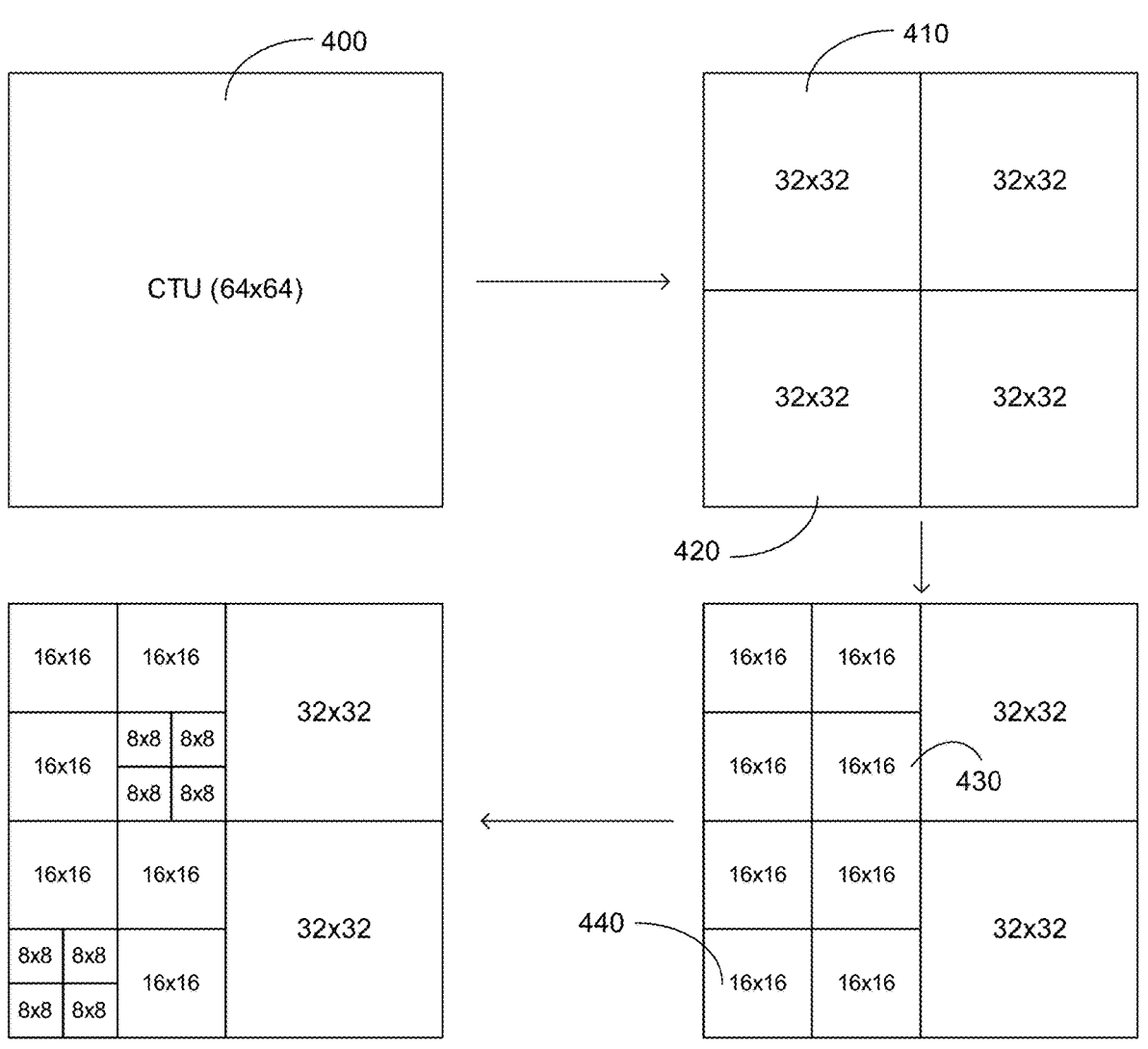
Figure 14:
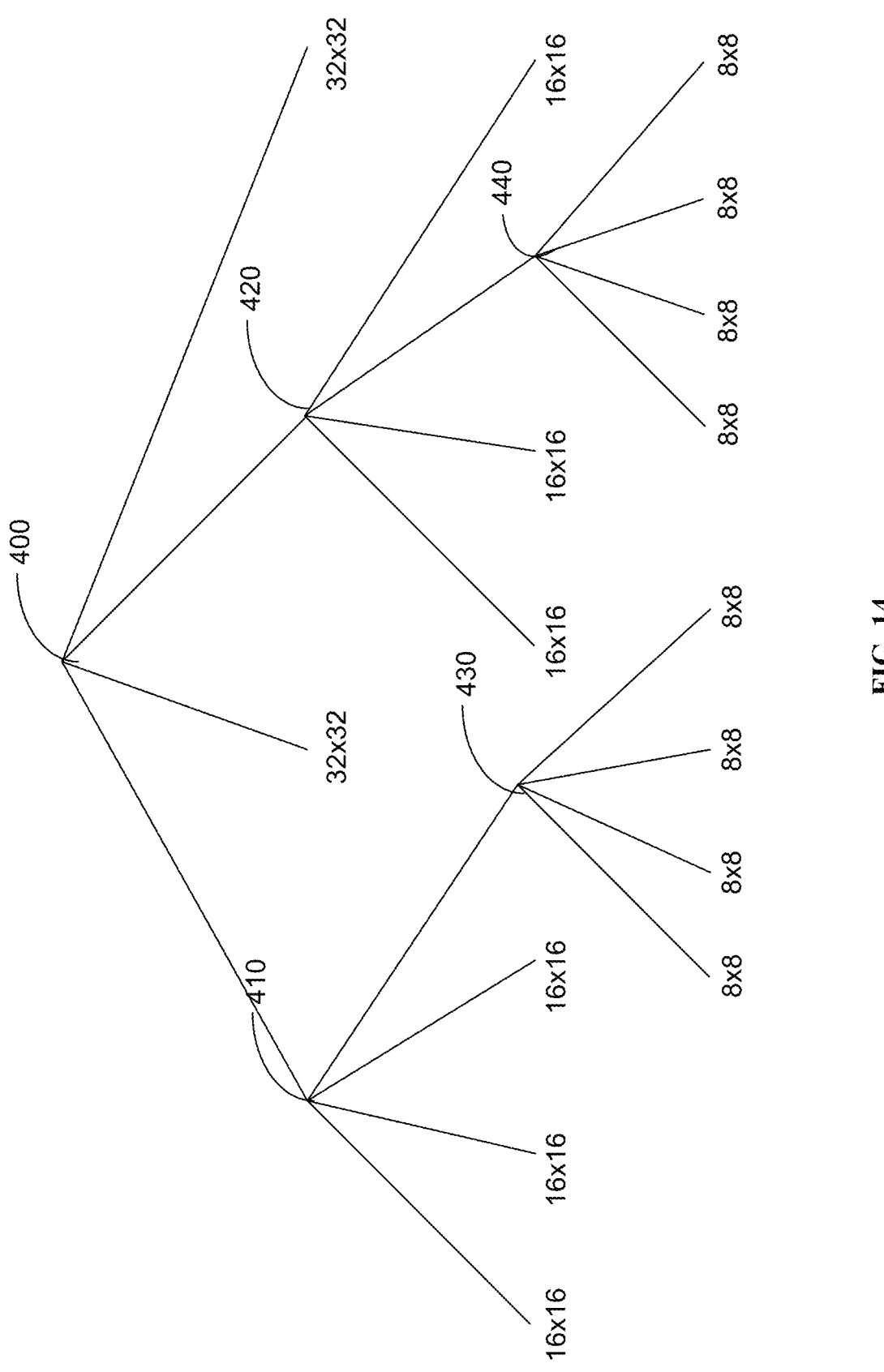
Figure 15:
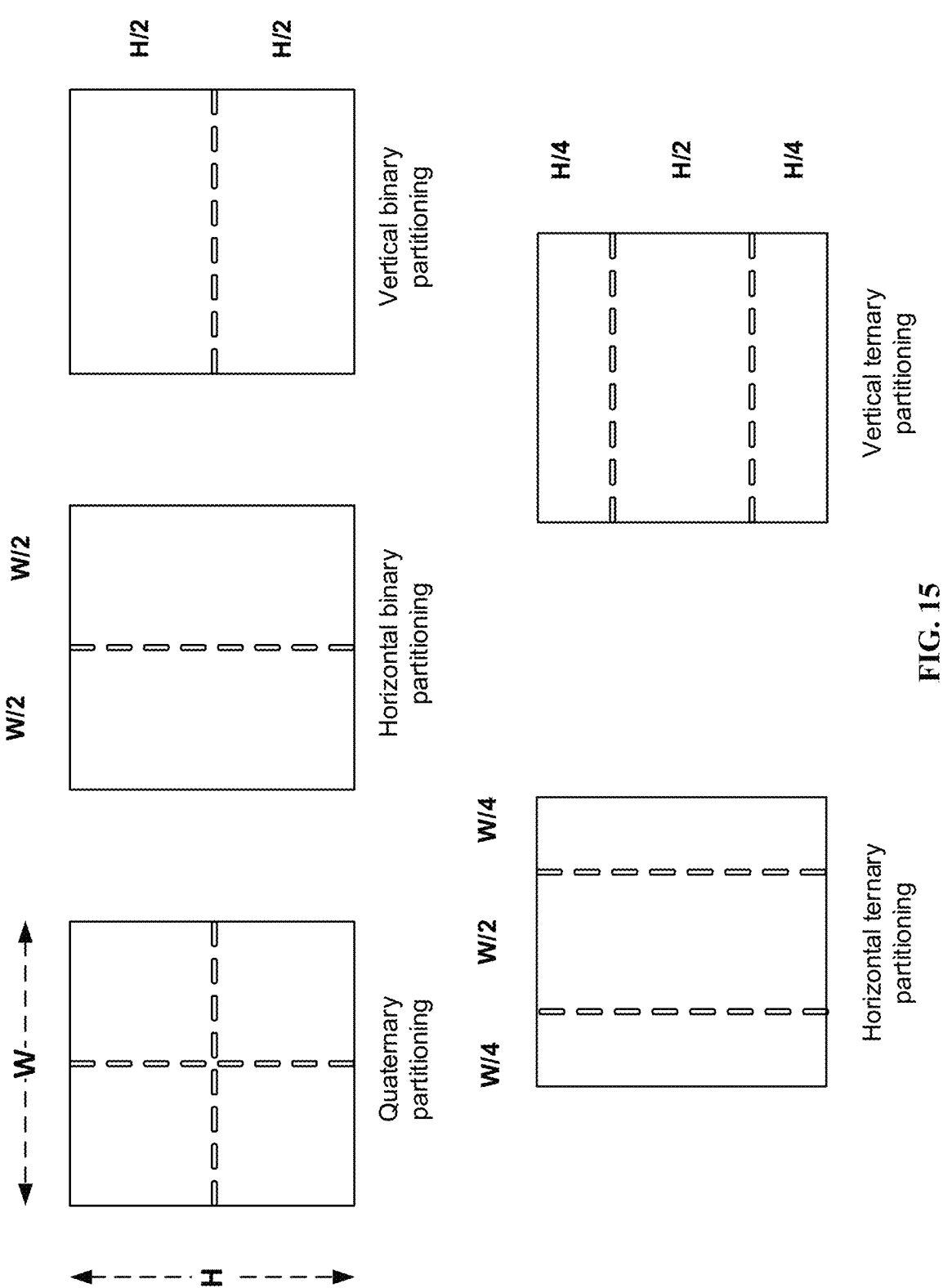
FIG. 15 illustrates partitioning types of a coding block in accordance with some examples of the present disclosure.

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 13, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 14 depicts a quad-tree data structure illustrating the end result of the partition process of the CTU 400 as depicted in FIG. 13, each leaf node of the quad-tree corresponding to one CU of a respective size ranging from 32×32 to 8×8. Like the CTU depicted in FIG. 12, each CU may comprise a CB of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIG. 13 and FIG. 14 is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 15, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may comprise a PB of luma samples, two corresponding PBs of chroma samples, and syntax elements used to predict the PBs. In monochrome pictures or pictures having three separate color planes, a PU may comprise a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 13, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit 42 as described above in connection with FIG. 9, the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

Although the DIMD/TIMD mode can enhance the intra prediction efficiency, there is room to further improve its performance. Meanwhile, some parts of the existing intra mode also need to be simplified for efficient codec hardware implementations or improved for better coding efficiency. Furthermore, the tradeoff between its implementation complexity and its coding efficiency benefit needs to be further improved.

It is to be understood that the figures in this disclosure can be combined with all examples mentioned in this disclosure, and the disclosed methods may be applied independently or jointly.

Decoder-Side High Precision Intra Mode Derivation (DHI)

In the first aspect of this disclosure, it is proposed to derive high precision intra mode from previous decoded information on TB/CB/slice/picture/sequence level. According to one or more embodiments of the disclosure, one control flag is signaled in TB/CB/slice/picture/sequence level to indicate whether the signaling of DHI mode is enabled or disabled. When the control flag is signaled as enabled, a flag of DHI mode is further signaled to decoder to indicate whether the DHI mode is used or not at signaled level. When the DHI mode is enabled, different methods may be used to derive the high precision intra mode, with some exemplar methods listed as follows. In one or more embodiments, when the DHI mode is enabled, a flag of DHI mode is further signaled to decoder to indicate whether the DHI mode is used or not at signaled level. When the DHI mode is used, different methods may be used to derive the high precision intra mode, with some exemplar methods listed as follows.

According to one or more embodiments of the disclosure, the high precision intra modes from neighboring intra modes or MPM list may be stored and used as current high precision intra mode. In one example, if the DHI mode is enabled and the neighboring intra modes are coded using TIMD mode, their high precision intra modes and their corresponding low precision intra modes are further stored in a mapping table to indicate which high precision mode is used when the decoder receives the corresponding low precision mode.

According to one or more embodiments of the disclosure, the cost of TIMD mode may be used to derive high precision intra mode in decoder. In one example, if the DHI mode is enabled and decoder receives one intra direction mode, its neighboring high precision intra modes are further checked based on cost of TIMD to determine whether the neighboring high precision intra mode is used or not. If the cost of neighboring high precision intra mode is lower than original intra mode, then the neighboring high precision intra mode is used.

According to one or more embodiments of the disclosure, the histogram of DIMD mode may be used to derive high precision intra mode in decoder. In one example, if the DHI mode is enabled and decoder receives one intra direction mode, its neighboring high precision intra modes are further checked based on histogram of DIMD to determine whether the neighboring high precision intra mode is used or not. If the histogram of neighboring high precision intra mode is higher than original intra mode, then the neighboring high precision intra mode is used.

According to one or more embodiments of the disclosure, the histogram of DIMD mode may be calculated in high precision intra mode in decoder. In one example, if the DHI mode is enabled, the orientation of the gradient is converted into an intra angular prediction mode with high precision (e.g., 133 modes), used to index a histogram (first initialized to zero). The histogram will contain cumulative values of gradient intensities, for each intra angular mode. The IPMs corresponding to two tallest histogram bars are selected for the current block. If the maximum value in the histogram is 0 (meaning no gradient analysis was able to be made, or the area composing the template is flat), then the DC mode is selected as intra prediction mode for the current block.

In the second aspect of this disclosure, it is proposed to derive high precision intra mode from previous decoded information on TB/CB/slice/picture/sequence level without signaling. According to one or more embodiments of the disclosure, no additional control flag is required and the high precision intra mode will be derived under some predefined condition (eg, specific modes, specific block sizes). When the predefined condition is matched, the high precision intra mode will be derived based on previous decoded information, different methods may be used to derive the high precision intra mode, with some exemplar methods listed as follows.

According to one or more embodiments of the disclosure, the high precision intra modes from neighboring intra modes or MPM list can be stored and used as current high precision intra mode. In one example, if the neighboring intra modes are coded using TIMD mode, their high precision intra modes and their corresponding low precision intra modes are further stored in a mapping table to indicate which high precision mode is used when the decoder receives the corresponding low precision mode.

According to one or more embodiments of the disclosure, the cost of TIMD mode may be used to derive high precision intra mode in decoder. In one example, if decoder receives one intra direction mode, its neighboring high precision intra modes are further checked based on cost of TIMD to determine whether the neighboring high precision intra mode is used or not. If the cost of neighboring high precision intra mode is lower than original intra mode, then the neighboring high precision intra mode is used. In another example, if decoder receives one intra direction mode, its neighboring high precision intra modes are further checked by cost of TIMD to indicate whether the neighboring high precision intra mode is used or not. If the cost of neighboring high precision intra mode is lower than the threshold (eg, $\frac{1}{2}$, $\frac{1}{3}$, $\frac{5}{8}$, $\frac{3}{4}$, $\frac{7}{8}$) of original intra mode, then the neighboring high precision intra mode is used. This threshold may be half the TIMD cost of the original intra mode.

According to one or more embodiments of the disclosure, the histogram of DIMD mode may be used to derive high precision intra mode in decoder. In one example, if decoder receives one intra direction mode, its neighboring high precision intra modes are further checked based on histogram of DIMD to determine whether the neighboring high precision intra mode is used or not. If the histogram of neighboring high precision intra mode is higher than original intra mode, then the neighboring high precision intra mode is used.

According to one or more embodiments of the disclosure, the histogram of DIMD mode may be calculated in high precision intra mode in decoder. In one example, the orientation of the gradient is converted into an intra angular prediction mode with high precision (e.g., 133 modes), used to index a histogram (first initialized to zero). The histogram will contain cumulative values of gradient intensities, for each intra angular mode. The IPMs corresponding to two tallest histogram bars are selected for the current block. If the maximum value in the histogram is 0 (meaning no gradient analysis was able to be made, or the area composing the template is flat), then the DC mode is selected as intra prediction mode for the current block.

Figure 16:
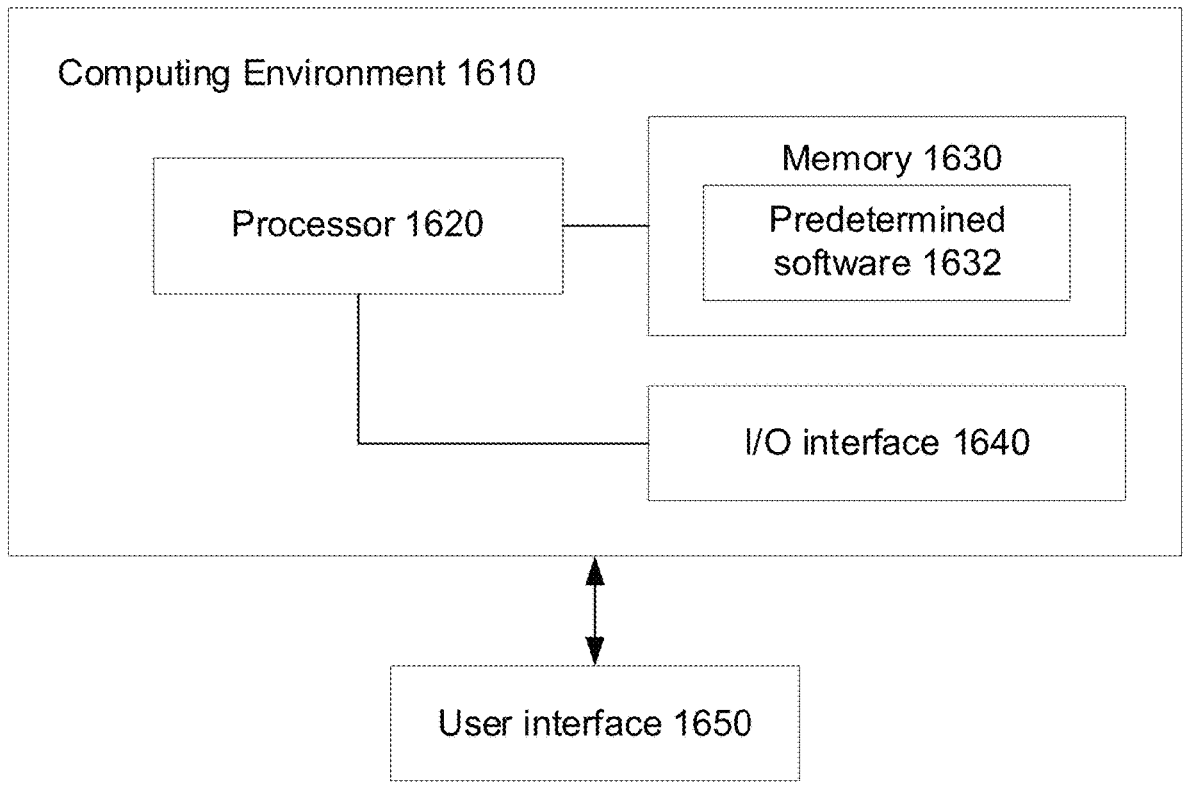
FIG. 16 is a computing environment in accordance with some examples of the present disclosure.

FIG. 16 shows a computing environment 1610 coupled with a user interface 1650. The computing environment 1610 can be part of a data processing server. The computing environment 1610 includes a processor 1620, a memory 1630, and an Input/Output (I/O) interface 1640.

The processor 1620 typically controls overall operations of the computing environment 1610, such as the operations associated with display, data acquisition, data communications, and image processing. The processor 1620 may include one or more processors to execute instructions to perform all or some of the steps in the above-described methods. Moreover, the processor 1620 may include one or more modules that facilitate the interaction between the processor 1620 and other components. The processor may be a Central Processing Unit (CPU), a microprocessor, a single chip machine, a Graphical Processing Unit (GPU), or the like.

The memory 1630 is configured to store various types of data to support the operation of the computing environment 1610. The memory 1630 may include predetermined software 1632. Examples of such data includes instructions for any applications or methods operated on the computing environment 1610, video datasets, image data, etc. The memory 1630 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1640 provides an interface between the processor 1620 and peripheral interface modules, such as a keyboard, a click wheel, buttons, and the like. The buttons may include but are not limited to, a home button, a start scan button, and a stop scan button. The I/O interface 1640 can be coupled with an encoder and decoder.

Figure 17:
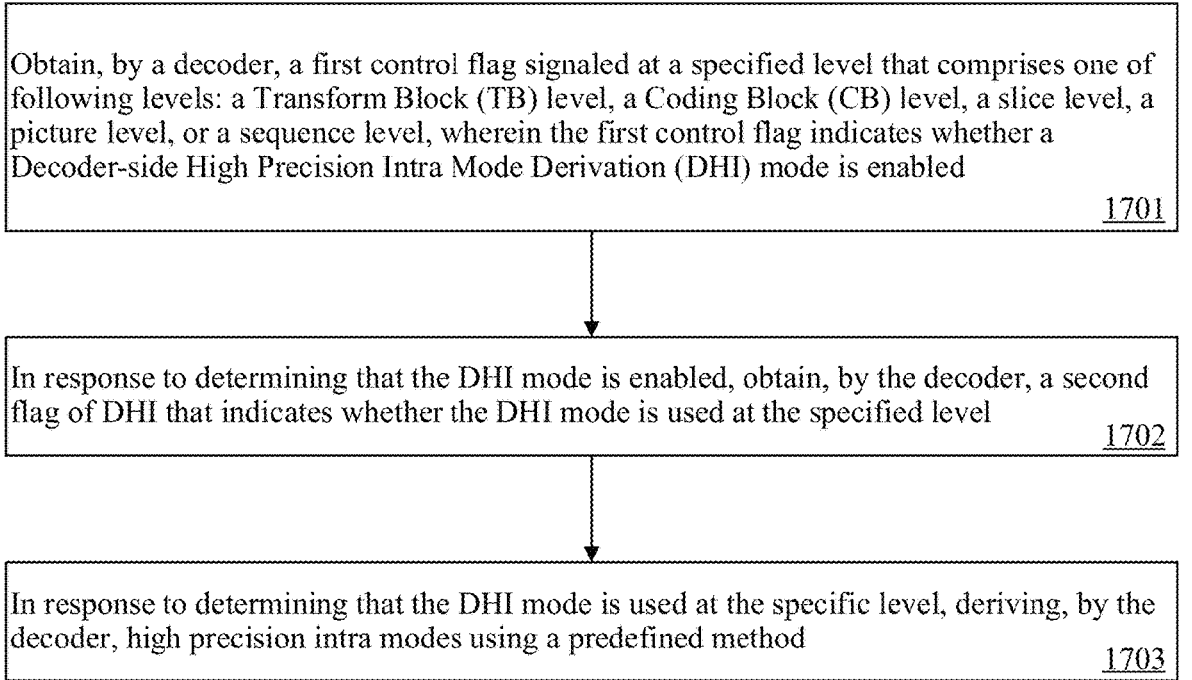
FIG. 17 is a flow chart illustrating a method for video decoding in accordance with some examples of the present disclosure.

FIG. 17 is a flowchart illustrating a method for video decoding according to an example of the present disclosure.

In Step 1701, the decoder may obtain a first control flag signaled at a specified level. For example, the specified level may include one of following levels: a Transform Block (TB) level, a Coding Block (CB) level, a slice level, a picture level, or a sequence level, where the first control flag indicates whether a Decoder-side High Precision Intra Mode Derivation (DHI) mode is enabled.

In some examples, the decoder, may determine whether one or more neighboring intra modes are coded using Template-based Intra Mode Derivation (TIMD) mode. In some examples, the decoder may store, in response to determining that the one or more neighboring intra modes are coded using the TIMD mode, high precision intra modes and corresponding low precision intra modes of the one or more neighboring intra modes to a mapping table. In response to obtaining a low precision intra mode, the decoder may obtain, based on the mapping table, a corresponding high precision intra mode. For example, the decoder may obtain the corresponding high precision intra mode based on the low precision intra mode and the mapping table.

In Step 1702, the decoder may obtain a second flag of DHI that indicates whether the DHI mode is used at the specified level in response to determining that the first control flag is enabled.

In some examples, the decoder may obtain an intra direction mode, check, by the decoder and according to a cost of Template-based Intra Mode Derivation (TIMD), neighboring high precision intra mode of the intra direction mode, and select the neighboring high precision intra mode based on the cost of neighboring high precision intra mode.

In Step 1703, the decoder may derive high precision intra modes using a predefined method in response to determining that the DHI mode is used.

In some embodiments, the decoder may determine that the neighboring high precision intra mode is used in response to determining that a cost of neighboring high precision intra mode is lower than a predetermined threshold of an original cost of the intra direction mode. In some embodiments, the predetermined threshold is half the original cost of the intra direction mode.

In some illustrations, the decoder may obtain an intra direction mode, check, according to a histogram of Decoder-side Intra Mode Derivation (DIMD), neighboring high precision intra mode of the intra direction mode, and select the neighboring high precision intra mode based on the histogram of neighboring high precision intra mode.

In some examples, the decoder may determine that the neighboring high precision intra mode is used in response to determining that the histogram of neighboring high precision intra mode is higher than an original histogram of the intra direction mode.

In some embodiments, the decoder may convert orientation of gradient into an intra angular prediction mode with high precision and index the histogram, where the histogram comprises cumulative values of gradient intensities for each intra angular prediction mode.

In some examples, the decoder may select the intra angular prediction mode for the current block based on two tallest histogram bars from the indexed histogram.

In some illustrations, in response to determining that a maximum value of the histogram is zero, the decoder may select DC mode as the intra angular prediction mode for the current block.

Figure 18:
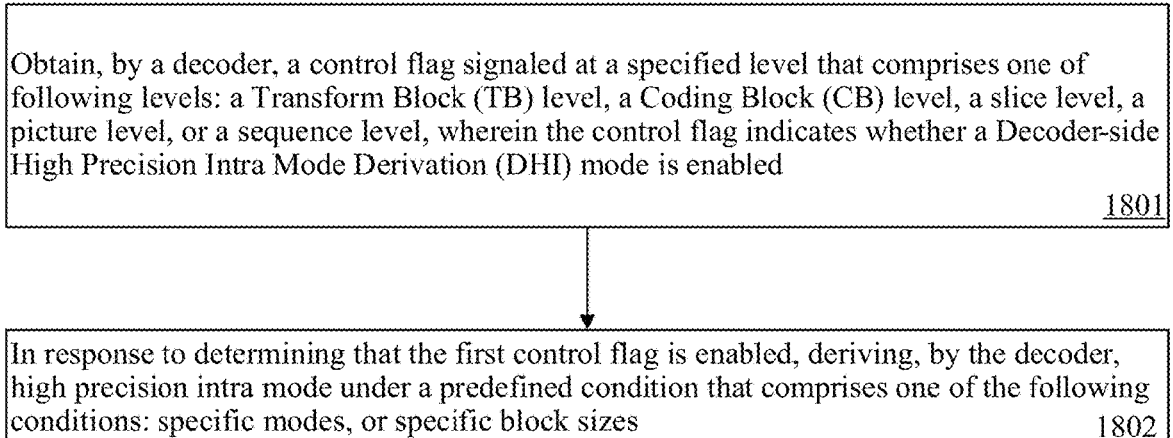
FIG. 18 is a flow chart illustrating a method for video decoding in accordance with some examples of the present disclosure.

FIG. 18 is a flowchart illustrating a method for video decoding according to an example of the present disclosure.

In Step 1801, the decoder may obtain a control flag signaled at a specified level that includes one of following levels: a Transform Block (TB) level, a Coding Block (CB) level, a slice level, a picture level, or a sequence level, where the first control flag indicates whether a Decoder-side High Precision Intra Mode Derivation (DHI) mode is enabled.

In some examples, the decoder may determine whether one or more neighboring intra modes are coded using Template-based Intra Mode Derivation (TIMD) mode. In some examples, the decoder may store, in response to determining that the one or more neighboring intra modes are coded using the TIMD mode, high precision intra modes and corresponding low precision intra modes of the one or more neighboring intra modes to a mapping table. In some examples, the decoder may obtain a corresponding high precision intra mode in response to obtaining a low precision intra mode based on the mapping table.

In Step 1802, the decoder may derive high precision intra mode under a predefined condition that includes one of the following conditions: specific modes, or specific block sizes in response to determining that the first control flag is enabled.

In some examples, the decoder may obtain, an intra direction mode, check, by the decoder and according to a cost of Template-based Intra Mode Derivation (TIMD), neighboring high precision intra mode of the intra direction mode, and select the neighboring high precision intra mode based on a cost of neighboring high precision intra mode.

In some embodiments, the decoder may determine that the neighboring high precision intra mode is used in response to determining that the cost of neighboring high precision intra mode is lower than a predetermined threshold of an original cost of the intra direction mode. In some embodiments, the predetermined threshold is half the original cost of the intra direction mode.

In some illustrations, the decoder may obtain an intra direction mode, check, according to a histogram of Decoder-side Intra Mode Derivation (DIMD), neighboring high precision intra mode of the intra direction mode, and select the neighboring high precision intra mode based on the histogram of neighboring high precision intra mode.

In some examples, the decoder may determine that the neighboring high precision intra mode is used in response to determining that the histogram of neighboring high precision intra mode is higher than an original histogram of the intra direction mode.

In some examples, the decoder may convert orientation of gradient into an intra angular prediction mode with high precision and index the histogram, where the histogram comprises cumulative values of gradient intensities for each intra angular prediction mode.

In some embodiments, the decoder may select the intra angular prediction mode for the current block based on two tallest histogram bars from the indexed histogram.

In some embodiments, the decoder may, in response to determining that a maximum value of the histogram is zero, select DC mode as the intra angular prediction mode for the current block.

FIG. 19 is a flowchart illustrating a method for video encoding according to an example of the present disclosure.

In Step 1901, the encoder may signal a first control flag at a specified level that comprises one of following levels: a Transform Block (TB) level, a Coding Block (CB) level, a slice level, a picture level, or a sequence level, where the first control flag indicates whether a Decoder-side High Precision Intra Mode Derivation (DHI) mode is enabled, in response to determining that the DHI mode is enabled, signal a second flag of DHI that indicates whether the DHI mode is used at the specified level, and in response to determining that the DHI mode is used at the specific level, derive high precision intra modes using a predefined method.

In some examples, the encoder, may determine whether one or more neighboring intra modes are coded using Template-based Intra Mode Derivation (TIMD) mode. In some examples, the encoder may store, in response to determining that the one or more neighboring intra modes are coded using the TIMD mode, high precision intra modes and corresponding low precision intra modes of the one or more neighboring intra modes to a mapping table.

In Step 1902, the encoder may obtain a second flag of DHI that indicates whether the DHI mode is used at the specified level in response to determining that the first control flag is enabled.

In some examples, the encoder may signal an intra direction mode, check, by the encoder and according to a cost of Template-based Intra Mode Derivation (TIMD), neighboring high precision intra mode of the intra direction mode, and select the neighboring high precision intra mode based on the cost of neighboring high precision intra mode.

In Step 1903, the encoder may derive high precision intra modes using a predefined method in response to determining that the DHI mode is used.

In some embodiments, the encoder may determine that the neighboring high precision intra mode is used in response to determining that a cost of neighboring high precision intra mode is lower than a predetermined threshold of an original cost of the intra direction mode. In some embodiments, the predetermined threshold is half the original cost of the intra direction mode.

In some illustrations, the encoder may signal an intra direction mode, check, according to a histogram of Decoder-side Intra Mode Derivation (DIMD), neighboring high precision intra mode of the intra direction mode, and select the neighboring high precision intra mode based on the histogram of neighboring high precision intra mode.

In some examples, the encoder may determine that the neighboring high precision intra mode is used in response to determining that the histogram of neighboring high precision intra mode is higher than an original histogram of the intra direction mode.

In some embodiments, the encoder may convert orientation of gradient into an intra angular prediction mode with high precision and index the histogram, where the histogram comprises cumulative values of gradient intensities for each intra angular prediction mode.

In some examples, the encoder may select the intra angular prediction mode for the current block based on two tallest histogram bars from the indexed histogram.

In some illustrations, in response to determining that a maximum value of the histogram is zero, the encoder may select DC mode as the intra angular prediction mode for the current block.

FIG. 20 is a flowchart illustrating a method for video encoding according to an example of the present disclosure.

In Step 2001, the encoder may signal a control flag at a specified level that comprises one of following levels: a Transform Block (TB) level, a Coding Block (CB) level, a slice level, a picture level, or a sequence level, where the first control flag indicates whether a Decoder-side High Precision Intra Mode Derivation (DHI) mode is enabled.

In some examples, the encoder may determine whether one or more neighboring intra modes are coded using Template-based Intra Mode Derivation (TIMD) mode. In some examples, the encoder may store, in response to determining that the one or more neighboring intra modes are coded using the TIMD mode, high precision intra modes and corresponding low precision intra modes of the one or more neighboring intra modes to a mapping table. In some examples, the encoder may obtain a corresponding high precision intra mode in response to obtaining a low precision intra mode based on the mapping table.

In Step 2002, the encoder may derive high precision intra mode under a predefined condition that comprises one of the following conditions: specific modes, or specific block sizes in response to determining that the control flag is enabled.

In some examples, the encoder may signal an intra direction mode, check, according to a cost of Template-based Intra Mode Derivation (TIMD), neighboring high precision intra mode of the intra direction mode, and select the neighboring high precision intra mode based on a cost of neighboring high precision intra mode.

In some embodiments, the encoder may determine that the neighboring high precision intra mode is used in response to determining that the cost of neighboring high precision intra mode is lower than a predetermined threshold of an original cost of the intra direction mode. In some embodiments, the predetermined threshold is half the original cost of the intra direction mode.

In some illustrations, the encoder may signal an intra direction mode, check, according to a histogram of Decoder-side Intra Mode Derivation (DIMD), neighboring high precision intra mode of the intra direction mode, and select the neighboring high precision intra mode based on the histogram of neighboring high precision intra mode.

In some examples, the encoder may determine that the neighboring high precision intra mode is used in response to determining that the histogram of neighboring high precision intra mode is higher than an original histogram of the intra direction mode.

In some examples, the encoder may convert orientation of gradient into an intra angular prediction mode with high precision and index the histogram, where the histogram comprises cumulative values of gradient intensities for each intra angular prediction mode.

In some embodiments, the encoder may select the intra angular prediction mode for the current block based on two tallest histogram bars from the indexed histogram.

In some embodiments, the encoder may, in response to determining that a maximum value of the histogram is zero, select DC mode as the intra angular prediction mode for the current block.

In some examples, there is provided an apparatus. The apparatus includes a processor 1620 and a memory 1630 configured to store instructions executable by the processor; where the processor, upon execution of the instructions, is configured to perform the method as illustrated in FIG. 17, FIG. 18, FIG. 19 or FIG. 20.

In some other examples, there is provided a non-transitory computer readable storage medium, having instructions stored therein. For example, the instructions may be stored as the predetermined software 1632, or a part of the software. When the instructions are executed by a processor 1620, the instructions cause the processor to perform the method as illustrated in FIG. 17, FIG. 18, FIG. 19 or FIG. 20. In one example, the plurality of programs may be executed by the processor 1620 in the computing environment 1610 to receive (for example, from the video encoder 20 in FIG. 9) a bitstream or data stream including encoded video information (for example, video blocks representing encoded video frames, and/or associated one or more syntax elements, etc.), and may also be executed by the processor 1620 in the computing environment 1610 to perform the decoding method described above according to the received bitstream or data stream. In another example, the plurality of programs may be executed by the processor 1620 in the computing environment 1610 to perform the encoding method described above to encode video information (for example, video blocks representing video frames, and/or associated one or more syntax elements, etc.) into a bitstream or data stream, and may also be executed by the processor 1620 in the computing environment 1610 to transmit the bitstream or data stream (for example, to the video decoder 30 in FIG. 10). Alternatively, the non-transitory computer-readable storage medium may have stored therein a bitstream or a data stream comprising encoded video information (for example, video blocks representing encoded video frames, and/or associated one or more syntax elements etc.) generated by an encoder (for example, the video encoder 20 in FIG. 9) using, for example, the encoding method described above for use by a decoder (for example, the video decoder 30 in FIG. 10) in decoding video data. The non-transitory computer-readable storage medium may be, for example, a ROM, a Random Access Memory (RAM), a CD-ROM, a magnetic tape, a floppy disc, an optical data storage device or the like.

In an embodiment, the is also provided a computing device comprising one or more processors (for example, the processor 1620); and the non-transitory computer-readable storage medium or the memory 1630 having stored therein a plurality of programs executable by the one or more processors, wherein the one or more processors, upon execution of the plurality of programs, are configured to perform the above-described methods.

In an embodiment, there is also provided a computer program product comprising a plurality of programs, for example, in the memory 1630, executable by the processor 1620 in the computing environment 1610, for performing the above-described methods. For example, the computer program product may include the non-transitory computer-readable storage medium.

In an embodiment, the computing environment 1610 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations may be included in some embodiments, having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising:
   obtaining, by a decoder, a first control flag signaled at a specified level that comprises one of following levels: a Transform Block (TB) level, a Coding Block (CB) level, a slice level, a picture level, or a sequence level, wherein the first control flag indicates whether a Decoder-side High Precision Intra Mode Derivation (DHI) mode is enabled,
   in response to determining that the DHI mode is enabled, deriving, by the decoder using a predefined method, a high precision intra mode under a predefined condition, wherein the predefined condition comprises one of following conditions:
   specific modes, or
   specific block sizes, or
   the DHI mode is used at the specified level.

2. The method of claim 1, wherein the predefined method comprises:

determining, by the decoder, whether one or more neighboring intra modes are coded using a Template-based Intra Mode Derivation (TIMD) mode;

storing, by the decoder and in response to determining that the one or more neighboring intra modes are coded using the TIMD mode, high precision intra modes and corresponding low precision intra modes of the one or more neighboring intra modes to a mapping table; and in response to obtaining a low precision intra mode, obtaining, by the decoder and based on the mapping table and the low precision intra mode, a corresponding high precision intra mode.

3. The method of claim 1, wherein the predefined method comprises:

obtaining, by the decoder, an intra direction mode;

checking, by the decoder and according to a cost of Template-based Intra Mode Derivation (TIMD), a neighboring high precision intra mode of the intra direction mode; and selecting, by the decoder, the neighboring high precision intra mode based on the cost of the neighboring high precision intra mode.

4. The method of claim 3, wherein the predefined method further comprises:

determining, by the decoder, that the neighboring high precision intra mode is used in response to determining that the cost of the neighboring high precision intra mode is lower than a predetermined threshold of an original cost of the intra direction mode.

5. The method of claim 4, wherein the predetermined threshold is half the original cost of the intra direction mode.

6. The method of claim 1, wherein the predefined method comprises:

obtaining, by the decoder, an intra direction mode;

checking, by the decoder and according to a histogram of Decoder-side Intra Mode Derivation (DIMD), a neighboring high precision intra mode of the intra direction mode; and selecting, by the decoder, the neighboring high precision intra mode based on the histogram of the neighboring high precision intra mode.

7. The method of claim 6, wherein the predefined method further comprises:

determining, by the decoder, that the neighboring high precision intra mode is used in response to determining that the histogram of the neighboring high precision intra mode is higher than an original histogram of the intra direction mode.

8. The method of claim 6, wherein the predefined method further comprises:

converting, by the decoder, an orientation of gradient into an intra angular prediction mode with high precision, and indexing, by the decoder, the histogram, wherein the histogram comprises cumulative values of gradient intensities for each intra angular prediction mode.

9. The method of claim 8, wherein the predefined method further comprises:

selecting, by the decoder, the intra angular prediction mode for the current block based on two tallest histogram bars from the indexed histogram.

10. The method of claim 9, wherein the predefined method further comprises:

in response to determining that a maximum value of the histogram is zero, selecting, by the decoder, a DC mode as the intra angular prediction mode for the current block.

11. The method of claim 1, further comprising:

obtaining, by the decoder, a second flag of DHI that indicates whether the DHI mode is used at the specified level, and determining, by the decoder in response to the second flag being enabled, that the DHI mode is used at the specific level.

12. An apparatus, comprising:

one or more processors; and a memory configured to store instructions executable by the one or more processors; wherein the one or more processors, upon execution of the instructions, are configured to:

obtain a first control flag signaled at a specified level that comprises one of following levels: a Transform Block (TB) level, a Coding Block (CB) level, a slice level, a picture level, or a sequence level, wherein the first control flag indicates whether a Decoder-side High Precision Intra Mode Derivation (DHI) mode is enabled, and in response to determining that the DHI mode is enabled, derive, using a predefined method, a high precision intra mode under a predefined condition, wherein the predefined condition comprises one of following conditions:

specific modes, or specific block sizes, or the DHI mode is used at the specified level.

13. The apparatus of claim 12, wherein the predefined method comprises:

determining, by a decoder, whether one or more neighboring intra modes are coded using a Template-based Intra Mode Derivation (TIMD) mode;

storing, by the decoder and in response to determining that the one or more neighboring intra modes are coded using the TIMD mode, high precision intra modes and corresponding low precision intra modes of the one or more neighboring intra modes to a mapping table; and in response to obtaining a low precision intra mode, obtaining, by the decoder and based on the mapping table and the low precision intra mode, a corresponding high precision intra mode.

14. The apparatus of claim 12, wherein the predefined method comprises:

obtaining, by the decoder, an intra direction mode;

checking, by the decoder and according to a cost of Template-based Intra Mode Derivation (TIMD), a neighboring high precision intra mode of the intra direction mode; and selecting, by the decoder, the neighboring high precision intra mode based on the cost of the neighboring high precision intra mode.

15. The apparatus of claim 14, wherein the predefined method further comprises:

determining, by the decoder, that the neighboring high precision intra mode is used in response to determining that the cost of the neighboring high precision intra mode is lower than a predetermined threshold of an original cost of the intra direction mode.

16. The apparatus of claim 15, wherein the predetermined threshold is half the original cost of the intra direction mode.

17. The apparatus of claim 12, wherein the predefined method comprises:

obtaining, by the decoder, an intra direction mode;

checking, by the decoder and according to a histogram of Decoder-side Intra Mode Derivation (DIMD), a neighboring high precision intra mode of the intra direction mode; and selecting, by the decoder, the neighboring high precision intra mode based on the histogram of the neighboring high precision intra mode.

18. The apparatus of claim 17, wherein the predefined method further comprises:

determining, by the decoder, that the neighboring high precision intra mode is used in response to determining that the histogram of the neighboring high precision intra mode is higher than an original histogram of the intra direction mode.

19. The apparatus of claim 12, further comprising:

obtaining, by the decoder, a second flag of DHI that indicates whether the DHI mode is used at the specified level, and determining, by the decoder in response to the second flag being enabled, that the DHI mode is used at the specific level.

20. A non-transitory computer readable storage medium storing a bitstream and instructions that when executed by at least one processor cause the at least one processor to perform acts comprising:

obtaining a first control flag signaled at a specified level that comprises one of following levels: a Transform Block (TB) level, a Coding Block (CB) level, a slice level, a picture level, or a sequence level, wherein the first control flag indicates whether a Decoder-side High Precision Intra Mode Derivation (DHI) mode is enabled, and in response to determining that the DHI mode is enabled, deriving, using a predefined method, a high precision intra mode under a predefined condition, wherein the predefined condition comprises one of following conditions:

specific modes, or specific block sizes, or the DHI mode is used at the specified level.

* * * * *